(12) United States Patent
Vonach

(10) Patent No.: US 10,602,576 B2
(45) Date of Patent: Mar. 24, 2020

(54) OPERATION OF AN ILLUMINANT BY MEANS OF A RESONANT CONVERTER

(71) Applicant: Tridonic GmbH & Co KG, Dornbirn (AT)

(72) Inventor: Christoph Vonach, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 479 days.

(21) Appl. No.: 14/758,169

(22) PCT Filed: Dec. 20, 2013

(86) PCT No.: PCT/AT2013/000213
§ 371 (c)(1),
(2) Date: Jun. 26, 2015

(87) PCT Pub. No.: WO2014/100844
PCT Pub. Date: Jul. 3, 2014

(65) Prior Publication Data
US 2015/0334797 A1   Nov. 19, 2015

(30) Foreign Application Priority Data
Dec. 28, 2012 (DE) .......................... 10 2012 224 513

(51) Int. Cl.
*H05B 33/08* (2020.01)
*H02M 7/538* (2007.01)
*H02M 7/48* (2007.01)

(52) U.S. Cl.
CPC .... *H05B 33/0815* (2013.01); *H02M 7/53803* (2013.01); *H02M 2007/4815* (2013.01); *Y02B 20/346* (2013.01); *Y02B 70/1441* (2013.01)

(58) Field of Classification Search
CPC ................. H05B 33/0815; H02M 7/53803
USPC .................... 315/200 R–297; 363/21.01
See application file for complete search history.

(56) References Cited

U.S. PATENT DOCUMENTS

| | | | | |
|---|---|---|---|---|
| 5,907,223 | A * | 5/1999 | Gu | H02M 1/4208 315/247 |
| 6,320,329 | B1 * | 11/2001 | Wacyk | H05B 41/392 315/291 |
| 7,313,004 | B1 * | 12/2007 | Yang | H02M 3/33523 363/21.02 |
| 2002/0067139 | A1 * | 6/2002 | Sabate | H02M 7/53803 315/224 |
| 2008/0042599 | A1 * | 2/2008 | Ashdown | H05B 33/0818 315/294 |
| 2010/0026208 | A1 * | 2/2010 | Shteynberg | H05B 33/0815 315/297 |

(Continued)

FOREIGN PATENT DOCUMENTS

| | | |
|---|---|---|
| DE | 102010031244 A1 | 9/2011 |
| EP | 1374642 A1 | 1/2004 |

(Continued)

*Primary Examiner* — Amr A Awad
*Assistant Examiner* — Jonathan Cooper
(74) *Attorney, Agent, or Firm* — Volpe and Koenig, P.C.

(57) ABSTRACT

The invention relates to an operating device for loads in the form of lighting means, particularly for LEDs, comprising: a clocked converter (B) having a switching element (20); a control unit (C) for switching the switching element (20) with an operating frequency, the operating frequency of the converter (B) being modulated as a forward or feedforward control.

9 Claims, 2 Drawing Sheets

(56) References Cited

U.S. PATENT DOCUMENTS

| | | | |
|---|---|---|---|
| 2010/0097829 A1* | 4/2010 | Uno | H02M 1/4225 363/124 |
| 2010/0164400 A1* | 7/2010 | Adragna | H02M 1/4225 315/294 |
| 2011/0140626 A1* | 6/2011 | Aurongzeb | H05B 33/0845 315/250 |
| 2011/0228574 A1* | 9/2011 | Shi | H02M 1/4225 363/42 |
| 2012/0170332 A1 | 7/2012 | Jing | |
| 2013/0119867 A1* | 5/2013 | Yu | H05B 33/0815 315/120 |
| 2013/0193849 A1* | 8/2013 | Zimmermann | H05B 33/0815 315/112 |

FOREIGN PATENT DOCUMENTS

| | | |
|---|---|---|
| EP | 2484180 A1 | 8/2012 |
| WO | 02076150 A1 | 9/2002 |
| WO | 2010064166 A1 | 6/2010 |
| WO | 2011039678 A1 | 4/2011 |

\* cited by examiner

OPERATION OF AN ILLUMINANT BY MEANS OF A RESONANT CONVERTER

FIELD OF THE INVENTION

The present invention relates generally to the operation of LEDs which can be understood as meaning inorganic LEDs and organic LEDs (OLEDs).

BACKGROUND

In principle, it is already known to supply an LED path, which may have one or more LEDs connected in series, with electrical power from an operating device having a constant current source. It is likewise known that, in order to generate this electrical power, the operating device comprises a resonant converter, for example in the form of an LLC circuit.

The invention now relates to a circuit in which an LLC circuit is supplied from a PFC circuit. The output voltage of the LLC circuit is subjected to potential isolation via a transformer, for example, and is then supplied, for example, to a further converter stage, in particular a constant current or buck converter, which in turn supplies the LED path.

In this case, the aim of the LLC circuit is to generate a constant voltage on the secondary side of the potential isolation. In this refinement, it is known that this constant voltage can be generated in such a manner that the LLC circuit is operated at a constant frequency in the range of resonance.

The object of the present invention is now to improve the electromagnetic compatibility (EMC) of such an operating device having a resonant converter.

SUMMARY

In order to now improve the EMC spectrum of the LLC circuit which is preferably operated at a constant frequency, the invention provides for a frequency sweep to be deliberately applied to the clocked operation of the LLC circuit. This makes it possible to counteract a constant operating frequency of the LLC circuit and therefore to improve the EMC.

In particular, when controlling the LLC circuit which should preferably be operated at a constant switching frequency, a frequency change is deliberately carried out. This frequency change is referred to as a so-called "sweep mode" or else "sweeping". In this case, the switching frequency which is kept constant on temporal average is accelerated and decelerated in a cyclically recurring manner, in particular.

According to the invention, the operating frequency of the LLC circuit is modulated by forward or feedforward control. A gradually changing value which is, in particular, independent of the states of the control path for the LLC circuit is therefore applied to the operating frequency.

The invention relates to a forward control mode, that is to say the frequency sweep curve is permanently predefined and is impressed on the LLC circuit without the involvement of a feedback loop. Therefore, the invention does not relate to any frequency sweeps which are randomly produced, for example on account of a control loop.

The sweep mode according to the invention which is aimed for is therefore not established by the operation of a control loop, but rather provision is made for the frequency sweep according to the invention to be impressed on a clocked element of the LLC circuit in the sense of a control mode. The frequency sweep according to the invention is provided in a forward control mode and therefore does not result from control loop activity.

The object is achieved, according to the invention, by the features of the independent claims. The dependent claims develop the central concept of the invention in a particularly advantageous manner.

A first aspect of the invention relates to an operating device for loads in the form of an illuminant, in particular for LEDs, having a clocked converter comprising a switching element, and a control unit for switching the switching element at an operating frequency. The operating frequency of the converter is modulated by forward or feedforward control.

Another aspect of the invention relates to a method for operating an operating device for loads in the form of an illuminant, in particular for LEDs. The operating device has a clocked converter with a switching element. The switching element is switched at an operating frequency. The operating frequency of the converter can be modulated by forward or feedforward control.

Another aspect of the invention relates to a control module for an operating device, in particular an integrated circuit, for example an ASIC, microcontroller or hybrid version thereof, characterized in that it is configured to support such a method.

Frequency modulation can be impressed on the operating frequency of the converter by forward or feedforward control.

The preferably constant operating frequency, which corresponds to a desired power consumption by the converter, can be modulated by forward or feedforward control.

The operating frequency resulting from control of the converter can additionally be modulated by forward or feedforward control.

The switching element may be in the form of an inverter and, in particular, in the form of a half-bridge inverter.

The converter may comprise a resonant circuit, preferably in the form of an LLC resonant circuit.

The resonant circuit may be in the form of a series resonant circuit or a parallel resonant circuit.

The converter may be connected to the output of a PFC circuit and may be supplied with a bus voltage generated by the PFC circuit.

The operating frequency of the PFC circuit can be modulated by forward or feedforward control.

DC decoupling in the form of a transformer, for example, can be connected downstream of the converter.

A further converter for generating a constant current for the illuminant can be connected downstream of the transformer.

A nominal value for the operating frequency can first of all be calculated before the operating frequency of the converter is modulated by forward or feedforward control.

The modulation of the operating frequency of the converter, which is defined by forward or feedforward control, can be selectively carried out on the basis of a dimming value of the illuminant.

BRIEF DESCRIPTION OF THE DRAWINGS

Further advantages, features and properties of the invention will become clear from the following description of preferred exemplary embodiments and with reference to the accompanying figures.

DETAILED DESCRIPTION OF THE PREFERRED EMBODIMENTS

The general structure of the lighting system according to the invention for LED-based lighting, for example, is explained in connection with FIG. 1. Both inorganic LEDs and/or organic LEDs (OLEDs) can be used. Alternatively, other illuminants, for example halogen lamps or gas discharge lamps, can also be operated.

The lighting system is preferably supplied with an input voltage Vmains, in particular a mains AC voltage. This input voltage Vmains is supplied to a power factor correction or PFC circuit A which carries out active power factor correction. The input voltage Vmains is typically supplied to a rectifier circuit (not shown) connected upstream of the PFC circuit A, with the result that the rectified input voltage is applied to the input of the PFC circuit A in this case.

The output voltage of the PFC circuit A is a bus voltage Vbus in the form of a DC voltage or a substantially constant voltage. On the basis of a mains AC voltage of 230 volts, the bus voltage Vbus may be 400 volts, for example. On account of the mains voltage frequency of 50 Hz in Europe, the bus voltage Vbus provided by the PFC circuit usually has ripple at a frequency of 100 Hz. A frequency of 120 Hz can be observed in the USA, for example.

The PFC may be, for example, a boost converter, a buck-boost converter, an insulated flyback converter or else a SEPIC converter. Alternatively, the PFC circuit A may also be omitted, with the result that the resonant converter B is supplied by the input voltage Vmains.

The bus voltage Vbus is supplied to a resonant converter B. The resonant converter B uses the bus voltage Vbus as a basis for generating a constant voltage. As a preferred exemplary embodiment, the resonant converter B may be in the form of an LLC circuit illustrated in FIG. 2. The resonant converter B may be configured to generate a constant voltage. The resonant converter B may alternatively be configured to generate a constant current.

Provision is also made of a control unit C which may be implemented, in particular, as an integrated circuit, for example an ASIC or microprocessor or hybrid thereof. In the exemplary embodiment, the control unit C is in the form of a hybrid version with an ASIC, on one side, and a microcontroller or microprocessor uC1, on the other side.

Figure 1:
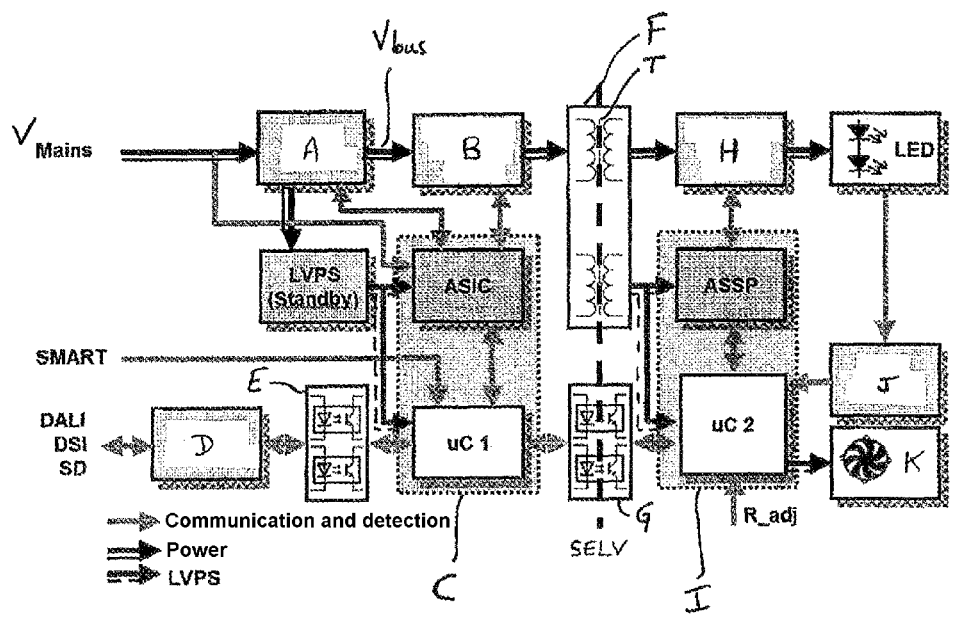
FIG. 1 schematically shows the structure of a lighting system according to the invention.

As schematically shown in FIG. 1, this control unit C controls active switching elements both of the PFC circuit A and of the resonant converter B. A half-bridge, in particular, is possible as a switching element for the resonant converter B, see FIG. 2.

The control unit C may have programming inputs, thus enabling programming or calibration programming of the control unit C. Such programming or calibration programming may be carried out in accordance with received SMART signals or DALI, DSI or SD signals.

The control unit C communicates with an interface D via DC decoupling E, in particular. This interface D has connections for connecting an external analog or digital bus (not shown) which may be configured according to the DALI industrial standard, for example. As a result, data can be transmitted in a bidirectional or else unidirectional manner according to this protocol. Alternatively or additionally, however, unidirectional or bidirectional signals can also be transmitted to this interface D according to other standards.

The DC voltage or constant voltage generated by the resonant converter B is supplied to DC decoupling F, in particular in the form of a transformer T. The input of the transformer T is coupled to the resonant converter and the output of the transformer is coupled to a further converter H for generating a constant current. This constant current source may be in the form of a buck converter, for example.

The constant current source H supplies the connected illuminant, in particular LEDs, with constant current. Alternatively, at least one further converter stage in the form of a further constant current source (not shown) may be provided between the constant current source H and the illuminant, these converter stages each being able to control independent illuminants which are separate from one another, in particular LED paths.

Alternatively, the constant current source H shown can also be omitted, with the result that the output of the resonant converter B or the output of the DC decoupling F could directly supply the illuminant. The LED path can also be accordingly supplied from the LLC circuit.

The further converter H may be in the form of a clocked constant current source—that is to say in the form of a buck converter, for example, or an insulated flyback converter—or a linear controller—implemented with transistors or integrated circuits.

Furthermore, a separate control unit I is provided for the further converter H, which control unit I may in turn be in the form of a microcontroller, ASIC or hybrid thereof. In the exemplary embodiment in FIG. 1, this control unit I is in the form of a hybrid version having an ASSP (application-specific standard product) and a microcontroller uC2.

The PFC circuit A forwards the input voltage Vmains to a low-voltage power supply LVPS which supplies the control unit C for the resonant converter B with voltage. The control unit I for the further converter H is supplied with voltage via a secondary-side winding of the transformer T.

In addition, the control unit I can have unidirectional or bidirectional data communication with the control unit C of the resonant converter B via DC decoupling G.

The secondary-side control unit I of the further converter H preferably receives feedback variables from the region of the illuminant or LEDs. The control unit I is responsible, in particular, for controlling the LEDs to a particular dimming level. In this case, the current through the LEDs is controlled, preferably on the basis of said feedback variables. In order to correctly operate the LEDs, a feedback variable such as the temperature of the LEDs can also be detected using a temperature sensor J and can be monitored by the control unit I, for example.

A passive or preferably active cooling means, in particular a cooling means controlled by the control unit I, for example a fan K or a cooling unit, may be additionally connected. The control unit I may control the fan K to cool the LEDs on the basis of the detected temperature, for example.

The control carried out by the control unit I can also be carried out on the basis of desired values for the brightness of the LEDs. Such desired values may be supplied to the control unit I via the interface D, the DC decoupling E, the control unit C and finally the DC decoupling G. Desired values may also be directly specified at a connection of the control unit I, for example by a user; in this case, a resistance value R_adj at a connection of the control unit I can determine the desired value in a known manner.

Figure 2:
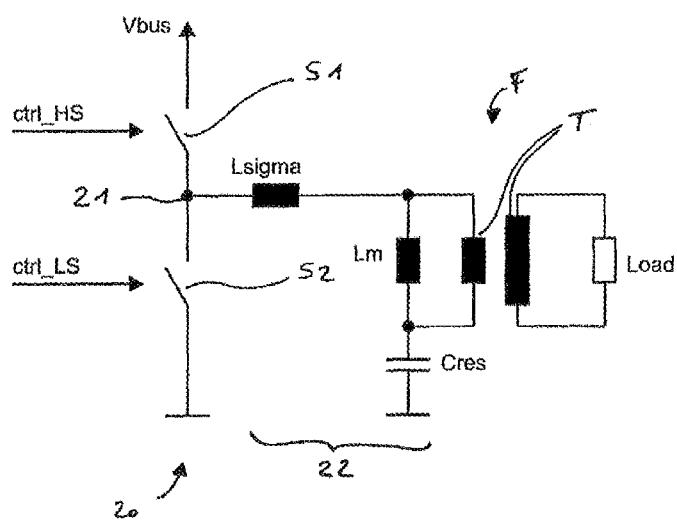
FIG. 2 shows an exemplary embodiment of a resonant converter in the form of an inverter having the following resonant circuit and transformer.

FIG. 2 shows an exemplary embodiment of a resonant converter B.

FIG. 2 shows that the output voltage of the PFC circuit A, namely the bus voltage Vbus, is supplied to an inverter 20 which may be in the form of a half-bridge inverter having two switches S1, S2, for example. The control signals for clocking the switches S1, S2 may be generated by the control unit C in a known manner. The switch S1 having a higher potential is controlled by the signal ctrl_HS, and the switch S2 having a lower potential is controlled by the signal ctrl_LS.

In the example illustrated, a resonant circuit, here in the form of a series resonant circuit, namely an LLC resonant circuit 22, is connected to the midpoint 21 of the inverter 20. In the example illustrated, this resonant circuit 22 has a first inductance Lsigma, a primary winding of the transformer T and a capacitor Cres.

In this case, the primary winding of the transformer T has a parallel inductance Lm which carries the magnetization current.

The transformer T is followed by a load Load which can be supplied with a supply voltage which is reduced in comparison with the bus voltage Vbus. According to the exemplary embodiment in FIG. 1, the load comprises the further converter H and the LEDs. Elements (not shown) for smoothing and stabilizing the output voltage may additionally be provided at the output of the transformer T.

In FIG. 2, the resonant circuit 22 is in the form of a series resonant circuit. Alternatively, the invention may likewise also be used in other resonant circuits, for example parallel resonant circuits. The resonant circuit according to the invention may accordingly be in the form of a parallel resonant circuit in which the resonant capacitor Cres is connected in parallel with the load and namely in parallel with the primary winding of the transformer T. The combination of the inverter 20 with the resonant circuit 22 forms a DC/DC converter, which is insulating as a result of the transformer T, as energy-transmitting converter.

The switches S1, S2 of the inverter 20 are preferably operated in the vicinity of the resonant frequency of the resonant circuit or in the vicinity of a harmonic of the resonance of the output circuit. The output voltage of the resonant converter or the DC decoupling F is a function of the control frequency of the switches S1, S2 of the inverter 20, here in the form of a half-bridge inverter.

The converter B shown in FIG. 1 is not restricted to a resonant converter and, in particular, is not restricted to the LLC converter shown in FIG. 2. The LLC circuit is a preferred example. Instead of an LLC circuit, however, the converter B according to the invention may also have a PWM (pulse-width-modulated)-clocked half-bridge circuit or a flyback converter.

Figure 3:
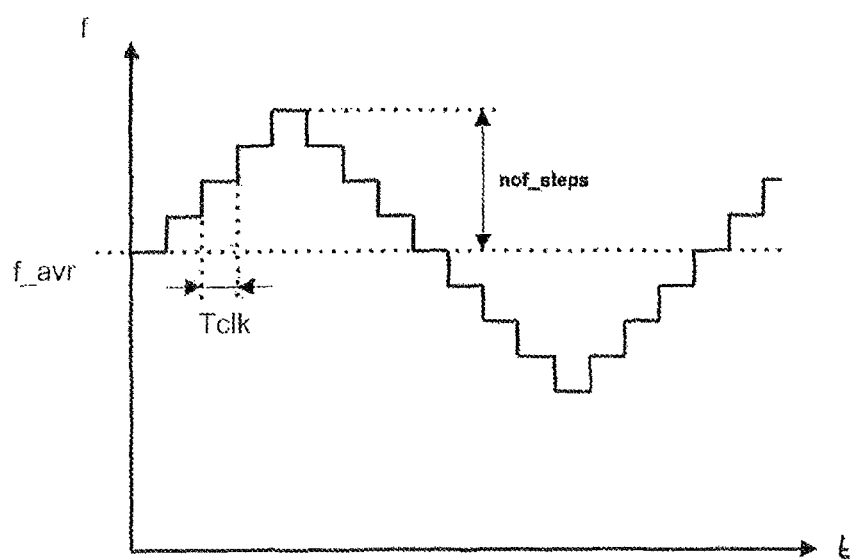
FIG. 3 shows an example of the change in the operating frequency of the converter according to the invention by forward or feedforward control.

FIG. 3 shows an example of the change in the operating frequency of the converter B according to the invention by forward or feedforward control.

In this case, the X axis represents the fundamental temporal profile of the switched-on period of the switches S1, S2 without scaling. The Y axis represents the temporal duration of the switched-on time of the switches S1, S2.

The value "f_avr" corresponds to the temporal average of the operating frequency of the resonant converter B, that is to say the temporal average of the operating frequency of the switches S1, S2.

On the basis of the nominal value of the switched-on time or the frequency for the switches S1, S2 of the resonant converter B, this nominal value is gradually incremented and decremented. The interval of time between the gradual incrementing and decrementing be determined by the value "Tclk". The incrementing and decrementing are repeated cyclically and are carried out around the nominal value in such a manner that the average of the switched-on time or frequency corresponds to the nominal value. The incrementing and decrementing are carried out by the control unit C.

In other words, the switching frequency which is kept constant on temporal average is accelerated and decelerated. More specifically, the switched-on period of the switches S1, S2 which is kept constant on temporal average is extended and shortened.

The value "nof_steps" defines the frequency jitter or switched-on time jitter for the switches S1, S2. This value defines the number of incrementing or decrementing steps starting from the average "f_avr". Each change in the switched-on period may signify extension or shortening in the region of one nanosecond (ns).

The period between two changes according to the invention in the switched-on period or switching frequency of the switches S1, S2 is therefore in the range of a few microseconds (μs).

Both parameters "f_avr" and "nof_steps" can be adjusted.

A reduction in the sense of the EMC rules can be achieved, for example, by changing the switching frequency of the switches S1, S2 according to the invention in the range of a few kHz.

As illustrated in FIG. 3 of the disclosure of the invention, the operating frequency of the LLC circuit, the switches S1, S2 of which are controlled by the ASIC, is again predefined by the microcontroller uC1. The sweep frequency curve, as shown by way of example in FIG. 3, is now permanently prestored in this microcontroller uC1.

The above-mentioned 100 Hz ripple at the output of the PFC circuit A is normally compensated for by the LLC circuit. Therefore, a frequency change already results for the switches S1, S2 as a result of this control loop for the operation, that is to say for the clocking, of the LLC circuit.

However, this effect results only if a sufficiently high power is intended to be supplied to the LED path.

Therefore, the artificial permanently predefined frequency sweep according to the present invention can be selectively provided such that it can be connected or amplified only when a low light power is requested, in the case of which the fluctuation (ripple) in the execution voltage of the PFC circuit does not itself result in a frequency sweep of the LLC circuit.

Provision may therefore be made for this sweep mode to be able to be carried out adaptively, that is to say also selectively, for example, on the basis of the current dimming value of the LED path. In particular, it can be carried out only when the light power is below a predefined threshold value.

If, for example, the PFC circuit provides an output voltage having ripple at a frequency of 100 Hz, a sweep frequency in the range of kHz is deliberately applied to the operating frequency of the LLC circuit. In addition, the frequency swing is relatively low, with the result that the fluctuation in the power provision in the range of the sweep frequency is also not reflected in the light power in a manner visible to humans when the further converter H is not able to compensate for these fluctuations.

As a result of the fact that the sweep frequency of the LLC circuit is in the range of kHz, it is ensured that there are also no low-frequency beat effects in interaction with the 100 Hz ripple in the output voltage of the PFC.

For example, if the temporal average of the operating frequency of the LLC circuit is in a range of between 80 kHz and 100 kHz, the frequency swing, that is to say the symmetrical frequency sweep, may be in a range of a few kHz.

The operating frequency for one switch of the active PFC circuit (A) may optionally also be frequency-modulated. This deliberate PFC sweep mode according to the invention can be used, in particular, during DC operation—that is to say when the input voltage Vmains is a DC voltage—in connection with the present invention.

The clock frequency of the LLC circuit is effected on the basis of detection of the bus voltage, that is to say the voltage provided by the PFC.

If an artificial sweep mode is now again impressed on the PFC in the sense of a control mode in the event of DC supply, for example in an emergency lighting situation, the clocking of the LLC circuit which is dependent on the bus voltage during forward or feedforward control, ripple in the output voltage of the PFC produced by the artificial sweep mode of the PFC circuit, may already result in sufficient EMC detection.

Therefore, the sweep mode of the LLC circuit may thus also be indirectly adjusted using the sweep mode of the PFC.

Alternatively, provision may be made for the ripple caused by the sweep mode of the PFC to not be sufficient for desired EMC improvement of the LLC circuit, with the result that the sweep mode of the LLC can also be activated in addition to the PFC sweep mode.

In this case, the PFC sweep mode is preferably considerably lower, for example several 100 Hz, than the sweep mode of the LLC circuit, with the result that no low-frequency beats and therefore no interference are produced even when both sweep modes of the PFC circuit and the LLC circuit are activated.

LIST OF REFERENCE SYMBOLS

20 Inverter
21 Midpoint of the inverter 20
22 LLC resonant circuit
A PFC circuit
B Resonant converter
C Control unit
D Interface
E DC decoupling
F DC decoupling
G DC decoupling
H Converter (constant current source)
I Control unit
J Temperature sensor
K Fan
LVPS Low-voltage power supply
S1, S2 Switches
T Transformer Vbus Bus voltage
Vmains Input voltage

What is claimed is:

1. An operating device for loads in the form of an illuminant, comprising:
a clocked converter (B), in the form of an LLC circuit, comprising a switching element (20),
a control unit (C) for switching the switching element (20) at an operating frequency, wherein
the operating frequency of the converter (B) is modulated by forward or feedforward control, and wherein a nominal value for the operating frequency is first calculated before the operating frequency of the converter (B) is modulated by forward or feedforward control and wherein the converter (B) is connected to an output of a PFC circuit (A) and is supplied with a bus voltage (Vbus) generated by the PFC circuit (A), wherein an operating frequency of the PFC circuit (A) is frequency-modulated, in a sweep mode, when the bus voltage (Vbus) is a DC voltage and wherein a sweep mode of the LLC circuit is activated if a desired electromagnetic compatibility (EMC) improvement, caused by a ripple of the sweep mode of the PFC circuit, is insufficient, and the sweep mode is selectively provided such that it is connected or amplified only when a low light power is requested and if the ripple in the voltage of the PFC circuit does not itself result in a frequency sweep of the LLC circuit.

2. The operating device as claimed in claim 1, wherein frequency modulation is imprinted on the operating frequency of the converter (B) by forward or feedforward control.

3. The operating device as claimed in claim 1, wherein a constant operating frequency, which corresponds to a desired power consumption by the converter (B), is modulated by forward or feedforward control.

4. The operating device as claimed in claim 3, wherein an operating frequency resulting from control of the converter (B) is further modulated by forward or feedforward control.

5. The operating device as claimed in claim 1, wherein the switching element (20) is in the form of an inverter.

6. The operating device as claimed in claim 1, wherein the converter (B) comprises a resonant circuit (22).

7. The operating device as claimed in claim 6, wherein the resonant circuit (22) is in the form of a series resonant circuit or a parallel resonant circuit.

8. The operating device as claimed in claim 1, wherein DC decoupling (F) in the form of a transformer (T) is connected downstream an inverter (20) of the converter (B).

9. The operating device as claimed in claim 8, wherein a further converter (H) for generating a constant current for the illuminant is connected downstream of the transformer (T).

* * * * *